United States Patent
Naganuma et al.

(10) Patent No.: US 6,960,848 B2
(45) Date of Patent: Nov. 1, 2005

(54) ELECTROMAGNETIC DRIVE DEVICE AND LIGHT QUANTITY ADJUSTMENT DEVICE USING THE SAME

(75) Inventors: Hiroaki Naganuma, Kofu (JP); Tetsuyuki Tohyama, Yamanashi-ken (JP)

(73) Assignee: Nisca Corporation, Yamanashi-Ken (JP)

( * ) Notice: Subject to any disclaimer, the term of this patent is extended or adjusted under 35 U.S.C. 154(b) by 31 days.

(21) Appl. No.: 10/800,640

(22) Filed: Mar. 16, 2004

(65) Prior Publication Data

US 2004/0222709 A1 Nov. 11, 2004

(30) Foreign Application Priority Data

May 9, 2003 (JP) .............................. 2003-132021
May 9, 2003 (JP) .............................. 2003-132022

(51) Int. Cl.[7] .......................... H02K 33/00; G03B 9/08
(52) U.S. Cl. ........................ 310/37; 396/463; 335/272; 335/225; 336/198
(58) Field of Search ...................... 310/15–39, 12–14, 310/194; 396/133, 463, 508, 75; 335/272, 335/225; 336/198, 208

(56) References Cited

U.S. PATENT DOCUMENTS

| | | | | |
|---|---|---|---|---|
| 4,227,164 A | * | 10/1980 | Kitahara | ...................... 335/230 |
| 4,319,823 A | * | 3/1982 | Hashimoto | ................... 396/463 |
| 5,334,893 A | * | 8/1994 | Oudet et al. | .................. 310/38 |
| 6,798,987 B2 | * | 9/2004 | Horiike | ........................ 396/75 |

FOREIGN PATENT DOCUMENTS

| | | |
|---|---|---|
| JP | 2541274 | 4/1997 |
| JP | 2606159 | 7/2000 |

* cited by examiner

*Primary Examiner*—Darren Schuberg
*Assistant Examiner*—Leda Pham
(74) *Attorney, Agent, or Firm*—Manabu Kanesaka

(57) ABSTRACT

An electromagnetic drive device includes a coil frame with a hollow tubular shape, a magnet rotor rotatably disposed in the coil frame through a rotational shaft, a transmission member for transmitting a rotation of the magnet rotor, and a coil wound around an outer periphery of the coil frame. The coil frame is formed of two coil frame halves divided vertically along the rotational shaft of the rotor, and the coil is wound in a direction crossing connection faces (joint faces) of the two coil frame halves on upper and lower end surfaces thereof.

13 Claims, 12 Drawing Sheets

ELECTROMAGNETIC DRIVE DEVICE AND LIGHT QUANTITY ADJUSTMENT DEVICE USING THE SAME

BACKGROUND OF THE INVENTION AND RELATED ART STATEMENT

The present invention relates to an electromagnetic drive device in which a magnet rotor formed of a permanent magnet is rotatably accommodated in a coil frame with a coil wound around on an outer periphery thereof so that the magnet rotor rotates when a direct current is supplied to the coil, and a light quantity adjustment device for adjusting a light quantity of an optical image pick-up device through a torque generated in the magnet rotor.

Generally, as disclosed in Japanese Utility Model No. 2541274, in an optical device such as a camera, an opening/closing blade member is provided at an image pick-up lens part on an optical axis of image light so that the blade member shields light under a so-called shutter control or adjusts the quantity of light under a so-called exposure control. Such a blade member is connected to a magnet rotor through a transmission member, and arranged to open and close when a current is supplied to a coil wound around the magnet rotor. In such an electromagnetic drive device comprising the magnet rotor and the coil, the magnet rotor is rotatably supported in a coil frame having a hollow tubular shape and formed of a resin and the like, and the coil is wound around an outer periphery of the coil frame. A yoke (magnetic induction member) covers an outer surface of the coil frame.

Conventionally, such a coil frame has a structure divided laterally (up and down) or vertically (left and right) with respect to a rotational shaft of the magnet rotor. The magnet rotor is disposed inside the coil frame, and the coil is wound around the outer periphery thereof, thereby integrally assembling the device. When the coil frame is divided laterally, it is necessary to provide a taper for easy molding. Also, it is sometimes difficult to smoothly rotate the magnet rotor due to a positional misalignment between upper and lower bearing portions when the magnet rotor is supported inside the coil frame, thereby causing a problem in manufacture.

The present invention relates to an improved structure of the coil frame divided vertically, thereby reducing a size of the device. Conventionally, a tubular (cylindrical) coil frame is divided vertically at the center thereof into two portions, and a magnet with a rotational shaft is disposed inside the coil frame. A transmission member protruding outwardly from the coil frame is attached to a rotational shaft of the magnet rotor. The coil is wound on concave grooves individually formed in each of the two divided coil frame halves, respectively. The two coil frame halves are joined at a center portion from which the rotational shaft of the magnet rotor protrudes, and are integrated with an adhesive tape.

In the structure of the conventional electromagnetic device, the coil frame halves with the coil wound around thereon are joined at the center portion where the rotational shaft is located, so that the tubular coil frame has a large diameter in a radial direction. When the coil has, for example, 200 turns, it is necessary to provide a winding margin such as the concave groove in each of the coil frame halves for winding 100 turns. Further, it is necessary to provide bearing portions for supporting the shaft at the center of the coil frame and thick wall portions for forming the bearing portions, thereby increasing a size of the device in the radial direction.

As disclosed in Japanese Utility Model No. 2606159, in an optical image pick-up device such as a video camera and still camera, a shutter blade for shielding light or a stop blade for adjusting light is disposed in a lens-barrel provided with an image pick-up lens to control a quantity of light. The blade member is disposed on an image pick-up optical axis in the lens-barrel to be rotatable or slidable, and an electromagnetic drive device drives and controls the blade member. In such an electromagnetic drive device, a magnet rotor is rotatably accommodated inside a coil frame with a conductive coil wound around an outer periphery thereof. A rotation of the magnet rotor is transmitted to the blade member for opening and closing or adjusting a photographing optical axis to increase and decrease an aperture diameter. Such a structure has been widely used in which the magnet rotor is polarized in two poles N and S, and a magnetic field is generated in the coil to rotate the rotor when a direct current is supplied to the coil.

In the electromagnetic drive device, the magnet rotor is rotatably supported in the coil frame having a hollow tubular shape and formed of a resin and the like, and a torque is transmitted to the blade member from the rotational shaft through a transmission arm. Accordingly, the coil frame has a structure divided into two portions for accommodating the magnet rotor inside. After the rotor is disposed inside the coil frame, the two portions are joined and the coil is wound around an outer periphery of the coil frame. The coil frame is divided vertically into two portions along the rotational shaft of the magnet rotor or divided laterally into two portions in a direction perpendicular the rotational shaft.

When the coil frame is divided vertically, even if a diameter of the coil frame is reduced to make the device small, since the two coil frame halves are joined (connected) vertically in a longitudinal direction, it is possible to join the two halves with little misalignment, thereby making it easy to install the magnet rotor. However, when the coil frame is divided vertically along the rotational shaft of the magnet rotor, it is necessary to provide bearing portions. Conventionally, as disclosed in Japanese Utility Model No. 2606159, a bearing concave portion is formed in each of the coil frame halves, and the coil frame halves are joined to support the rotational shaft.

When the bearing concave portion is formed in each of the coil frame halves and the coil frame halves are joined to support the rotational shaft of the magnet rotor, it is difficult to smoothly rotate the magnet rotor if the concave portions have low dimensional accuracy so that a positional misalignment occurs when the coil frame halves are joined. Recently, the device has been made small, and it is necessary to accurately form a bearing portion to support a rotational shaft of a rotor having a diameter of only about 1 mm. In view of electric power consumption, it is necessary to provide a bearing portion of a rotational shaft with a low mechanical loss such as friction.

In view of the problems described above, the present invention has been made, and an object of the present invention is to provide an electromagnetic drive device with a compact size and easy to manufacture, and a light quantity adjustment device using the same, wherein a coil is wound around a coil frame divided vertically into two portions along a rotational shaft of a rotor without dividing the coil, and it is possible to prevent a breakage of the coil wire by a groove at a joint line of the coil frame.

Another object of the present invention is to provide an electromagnetic drive device in which it is easy to form a coil frame for supporting a magnet rotor with a small mechanical loss at a bearing portion of a rotational shaft, thereby rotating the magnet rotor smoothly.

Further objects and advantages of the invention will be apparent from the following description of the invention.

SUMMARY OF THE INVENTION

In order to achieve the objects described above, according to a first aspect of the present invention, an electromagnetic drive device includes a coil frame with a hollow tubular shape, a magnet rotor rotatably disposed in the coil frame through a rotational shaft, a transmission member for transmitting a rotation of the magnet rotor, and a coil wound around an outer periphery of the coil frame. The coil frame is formed of two coil frame halves divided vertically along the rotational shaft of the rotor, and the coil is wound in a direction crossing a connection line (joint line) on upper and lower end surfaces of the two coil frame halves.

In the first aspect of the invention, the coil frame is formed of the coil frame halves divided vertically along the rotational shaft of the magnet rotor. The coil is wound around an outer periphery of the coil frame in a direction crossing a line or groove formed by connection surfaces of the coil frame halves at the upper and lower end surfaces thereof, so that a coil wire is not broken at the connection line when the coil is wound or in use. Accordingly, as compared with a conventional device in which a coil is wound on each of coil frame halves divided vertically, it is possible to increase a space for winding the coil and decrease a size of the device. Further, as compared with the conventional device in which the coil is wound in each of the coil frame halves divided separately, it is possible to wind just a single coil on the coil frame.

According to a second aspect of the present invention, in the electromagnetic drive device of the first aspect of the invention, the transmission member is disposed in a direction approximately perpendicular to a winding direction of the coil. An opening is formed in a part of connection surfaces of the coil frame halves for allowing the transmission member to rotate by a predetermined angle. Accordingly, the coil is wound in a direction approximately perpendicular to the transmission member, so that the transmission member such as an arm member is arranged approximately perpendicular to the coil wound around the outer periphery of the coil frame. As a result, it is possible to rotate the transmission member in left and right directions by a predetermined angle (usually about 60 degrees), thereby increasing an area for winding the coil around the coil frame.

According to a third aspect of the present invention, in the electromagnetic drive device in the first aspect of the invention, the coil is wound in a direction approximately perpendicular to the connection line on the upper and lower end surfaces of the two coil frame halves, and the transmission member is disposed in a direction approximately perpendicular to the winding direction of the coil. Accordingly, the coil is wound in a direction approximately perpendicular to the groove formed by the connection surfaces of the two coil frame halves in the upper and lower end surfaces thereof, thereby preventing a breakage of the coil by the groove.

According to a fourth aspect of the present invention, in the electromagnetic drive device in the first aspect of the invention, one of the bearing portions for supporting the rotational shaft of the magnet rotor is formed in one of the two coil frame halves. Accordingly, the rotational shaft of the magnet rotor is supported on the one of the two coil frame halves, so that the bearing portions located vertically are not shifted relative to each other.

According to a fifth aspect of the present invention, in the electromagnetic drive device in the first aspect of the invention, one of the bearing portions for supporting the rotational shaft of the magnet rotor is formed in one of the coil frame halves, and the other of the bearing portions is formed in the other of the coil frame halves. Accordingly, the pair of the bearing portions for supporting the rotational shaft of the magnet rotor is formed in the divided two coil frame halves, so that the magnet rotor can be easily disposed to the bearing portions when the coil frame halves are joined, thereby making the manufacture of the device easy.

According to a sixth aspect of the present invention, in the electromagnetic drive device in the first aspect of the invention, a bearing concave portion is provided in one of the coil frame halves for supporting one end of the rotational shaft of the magnet rotor, and a bearing concave portion is provided in the other of the coil frame halves for supporting the other end of the rotational shaft, so that the two coil frame halves are joined to form the coil frame.

In the sixth aspect of the invention, an electromagnetic drive device includes a coil frame having a hollow tubular shape; a cylindrical magnet rotor rotatably disposed in the coil frame and having a rotational shaft at a center thereof; a transmission member attached to the rotational shaft for transferring a rotation of the magnet rotor to an outside of the coil frame; and a coil wound around an outer periphery of the coil frame. The coil frame is formed of two coil frame halves divided vertically along the rotational shaft of the magnet rotor. A bearing concave portion is formed in one of the coil frame halves for supporting one end of the rotational shaft, and a bearing concave portion is formed in the other of the coil frame halves for supporting the other end of the rotational shaft, respectively. Accordingly, it is possible to join the two coil frame halves at connection surfaces thereof in an axial direction without misalignment. The bearing concave portions for supporting the rotational shaft are formed individually in the coil frame halves, thereby preventing a bite phenomenon of a conventional device in which bearing concave portions are connected. As a result, it is easy to make a compact device.

According to a seventh aspect of the present invention, in the electromagnetic drive device in the sixth aspect of the invention, the bearing concave portion formed in the one of the coil frame halves protrudes toward the other of the coil frame halves, so that it is easy to locate the bearing concave portions at the center of the two coil frame halves. Especially, when the coil frame halves are formed in a tubular shape with a same diameter, it is possible to form the bearing concave portions at the center of the coil frame halves according to an external dimension of the tubular shape, thereby making the manufacture easy.

According to an eighth aspect of the present invention, in the electromagnetic drive device in the sixth aspect of the invention, the rotational shaft has pointed ends. The bearing concave portions are formed of pivot bearings, so that the magnet rotor is supported pivotally and rotates smoothly. At the same time, the bearing concave portions are individually formed in the coil frame halves, thereby making is easy to form.

According to a ninth aspect of the present invention, in the electromagnetic drive device in the first aspect of the invention, the coil is wound in a direction crossing the connection line on the upper and lower end surfaces of the two coil frame halves. The two coil frame halves are joined to form the coil frame, and the groove is formed by the connection surfaces. Accordingly, it is possible to prevent a breakage of the coil wire when the coil is wound in the direction crossing the connection surfaces (groove).

According to a tenth aspect of the present invention, an electromagnetic drive device includes a cylindrical magnet rotor having a rotational shaft and a pair of magnetic poles formed along a direction perpendicular to the rotational shaft; a transmission member extending in a radial direction of the magnet rotor approximately perpendicular to a direction of the magnetic poles; a coil frame with a hollow tubular shape for retaining the magnet rotor and the transmission member to be rotatable through the rotational shaft; and a coil wound around an outer periphery of the coil frame. The coil frame is formed of two coil frame halves divided vertically along the rotational shaft in a direction crossing the direction of the magnetic poles. An opening is formed in connection surfaces of the coil frame halves for allowing the transmission member to rotate by a predetermined angle, and the coil is wound in a direction approximately identical to the direction of the magnetic poles.

In the tenth aspect of the invention, the coil frame is divided in the direction perpendicular to the direction of the magnetic poles of the magnet rotor, and the coil is wound in the direction approximately identical to the direction of the magnetic poles and approximately perpendicular to the groove formed by the connection surfaces of the coil frame halves, thereby preventing a breakage of the coil wire.

According to an eleventh aspect of the present invention, in the electromagnetic drive device in the tenth aspect of the invention, the coil frame is formed of the coil frame halves divided vertically along the rotational shaft of the magnet rotor. An opening is formed in the connection surfaces of the coil frame halves for allowing the transmission member to protrude to an outside of the coil frame. A pivot bearing portion is formed in one of the coil frame halves for supporting one end of the rotational shaft, and a pivot bearing portion is formed in the other of the coil frame halves for supporting the other end of the rotational shaft, respectively. It is possible to obtain advantages similar to the first aspect of the invention.

According to a twelfth aspect of the present invention, a light quantity adjustment device includes a base plate having an optical axis aperture; a blade member for adjusting a quantity of light passing through the optical axis aperture of the base plate; a coil frame with a hollow tubular shape attached to the base plate; a magnet rotor rotatably disposed in the coil frame through a rotational shaft; a transmission member for transmitting a rotation of the magnet rotor to the blade member; and a coil wound around an outer periphery of the coil frame. The coil frame is formed of two coil frame halves divided vertically along the rotational shaft of the rotor, and the coil is wound in a direction intersecting connection surfaces of the two coil frame halves on upper and lower end surfaces thereof. Accordingly, it is possible to reduce a size of the light quantity adjustment device such as a shutter device and a light quantity stop device to be incorporated in an image pick-up lens-barrel of a camera and the like, thereby reducing a size of the camera lens-barrel.

According to a thirteenth aspect of the present invention, in the light quantity adjustment device in the twelfth aspect of the invention, the coil frame is formed of the two coil frame halves divided vertically along the rotational shaft of the magnet rotor. A bearing concave portion is formed in one of the coil frame halves for supporting one end of the rotational shaft, and a bearing concave portion is formed in the other of the coil frame halves for supporting the other end of the rotational shaft, respectively. Accordingly, the coil frame retaining the magnet rotor with the coil wound around is easy to manufacture in a small size, thereby reducing a size and cost of an optical device using the light quantity adjustment device.

DETAILED DESCRIPTION OF PREFERRED EMBODIMENTS

Figure 1:
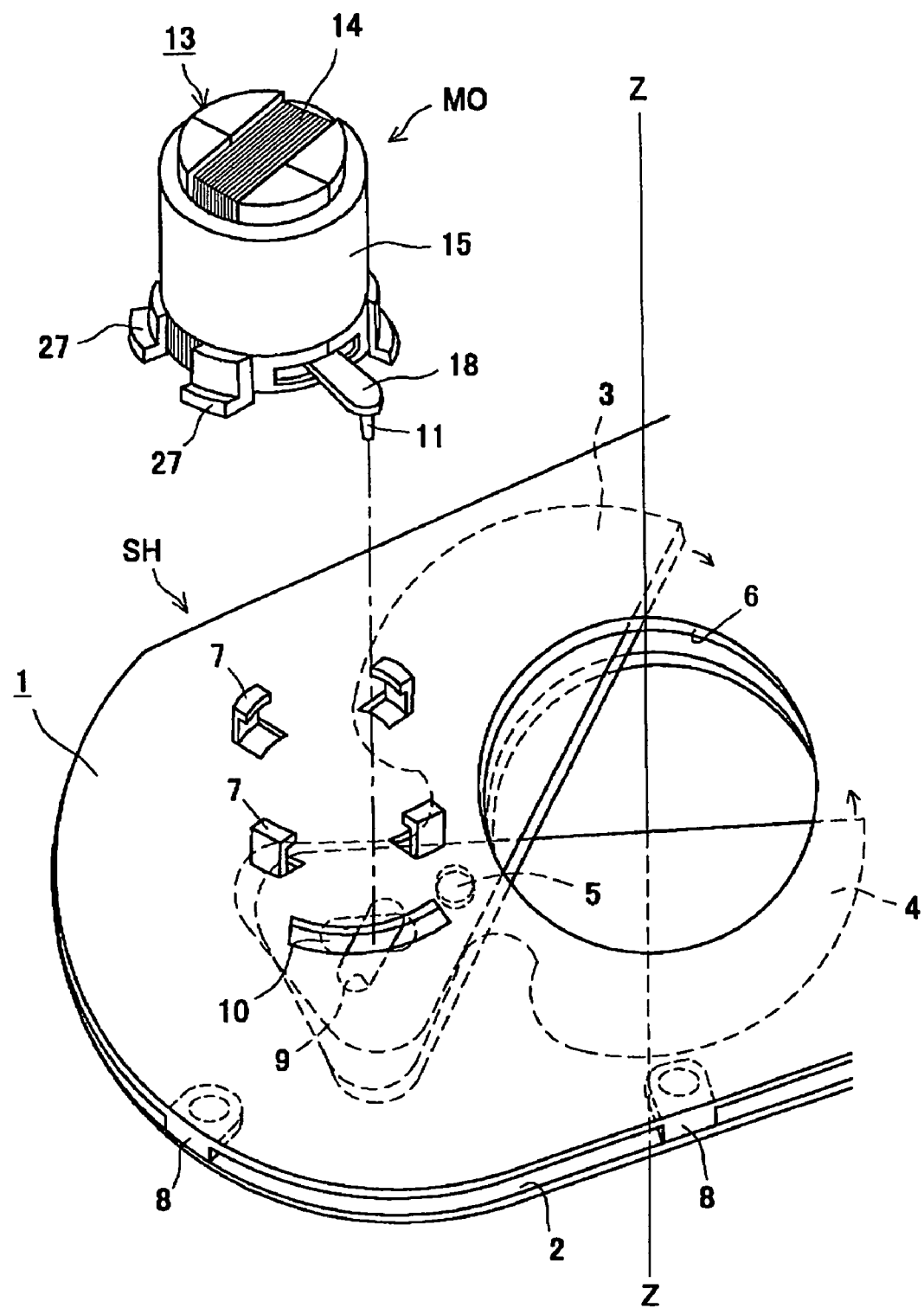
FIG. 1 is a perspective view showing a light quantity adjustment device (shutter device) in a partially exploded state according to the invention.

Hereunder, embodiments of the invention will be explained with reference to the accompanying drawings. FIG. 1 is a vie showing a shutter device for a camera according to an embodiment of the invention, in which MO denotes an electromagnetic drive device according to the invention, and SH denotes a light quantity adjustment device. As shown in FIG. 1, the light quantity adjustment device SH includes two blades 3 and 4 rotatably accommodated between a pair of plate-like base plates 1 and 2 with a pin 5, so that the blades 3 and 4 open and close an optical axis aperture 6 formed in the base plates 1 and 2. The base plate 1 is formed of a synthetic resin including polycarbonate as a main component with a resin molding, and the optical axis aperture is formed at a center of the base plate 1 for passing light of a camera device.

The base plate 1 is integrally provided with the pin 5 for supporting the blades 3 and 4 and hook protrusions 7 for fixing the electromagnetic drive device MO (described later). The base plate 1 is also provided with protrusions 8 at suitable positions on a peripheral edge thereof to form a predetermined gap when the base plate 2 is attached to the protrusions 8. The blades 3 and 4 are supported between the pair of the base plates 1 and 2 to open and close freely. The base plate 2 is formed of a thin metal plate and the like, and is integrally attached to the base plate 1 by fixing means such as a small screw. The base plate 2 has the optical axis aperture 6 at a center thereof.

The blades 3 and 4 are formed of a polyester film plate or a metal thin plate (two blades structure), and are disposed in the optical axis aperture 6 such that tip portions of the semicircular plates close and open the optical axis aperture 6. The blades 3 and 4 are provided with slits 9 and 10 for engaging a drive device (described later) at base end parts thereof, respectively.

The blades 3 and 4 are fitted to the pin 5 on the base plate 1 to rotate around the pin 5, and the slits 9 and 10 of the two blades 3 and 4 are arranged with an angle in opposite directions as shown in FIG. 1. One of the blades 3 and 4 rotates in a direction opposite to a direction that the other rotates, i.e. one rotates clockwise and the other rotates counterclockwise, through a transmission pin 11 of the drive device (described later). Incidentally, in the embodiment, the blades are formed of the two blades, and may be formed of one piece or three or more pieces. In a case of one piece, a blade moves in left and right directions in FIG. 1, i.e. so-called focal-plane shutter. In a case of three or more pieces, blades are disposed around the optical axis aperture with a predetermined gap, and pins are provided in a ring-like operation member disposed at an outer periphery of the optical axis aperture, so that the pins are fitted to slits formed in the blades. The ring-like operation member rotates through the transmission pin 11 of the drive device (described later) by a predetermine angle to open and close the optical axis aperture.

Figure 2:
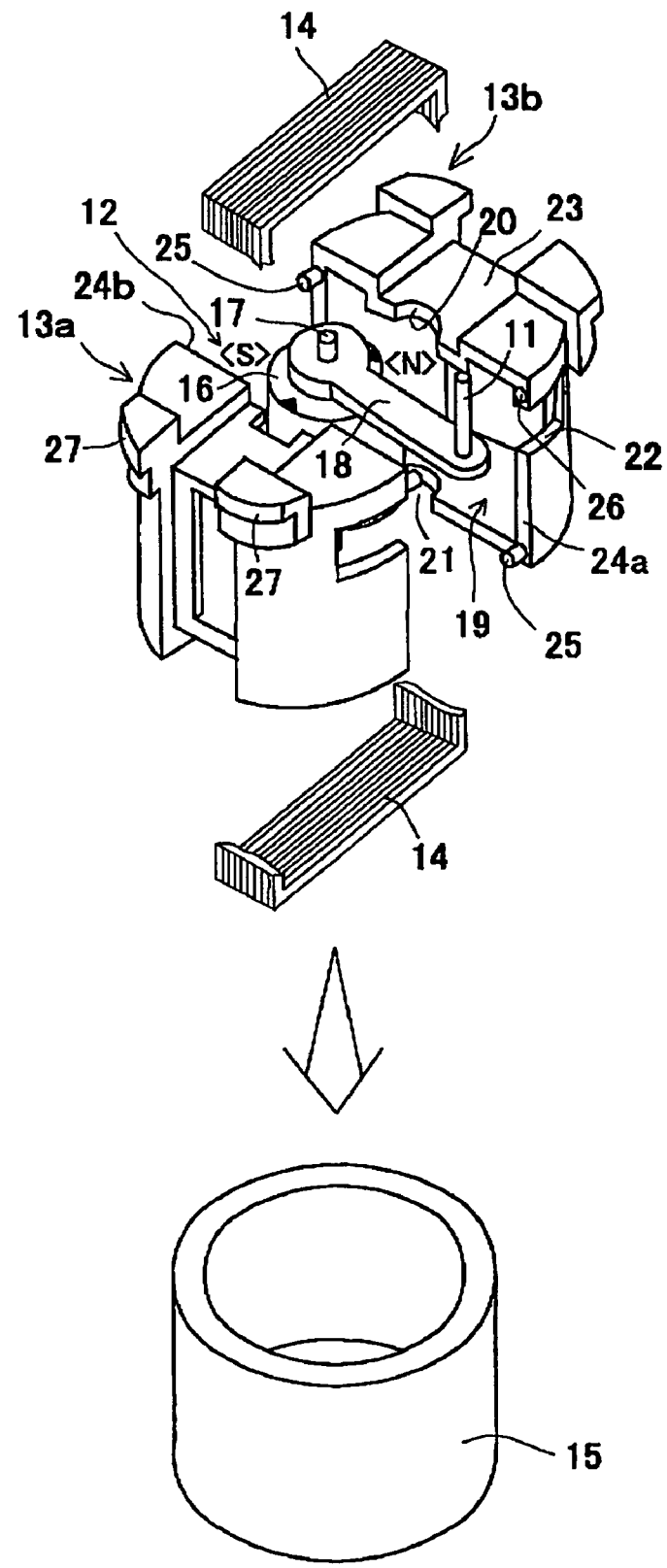
FIG. 2 is an exploded perspective view of the electromagnetic drive device shown in FIG. 1.
Figure 3:
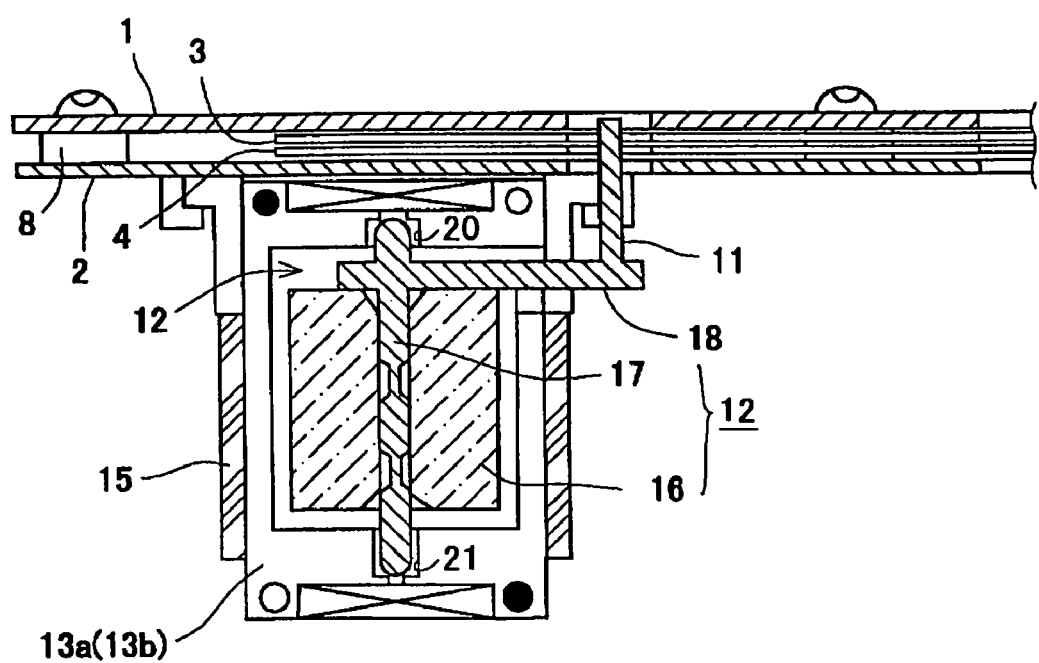
FIG. 3 is a longitudinal sectional view of the electromagnetic drive device shown in FIG. 1.

The electromagnetic drive device MO drives the light quantity adjustment device SH as follows. FIG. 2 is an exploded perspective view of the electromagnetic drive device MO, and FIG. 3 is a longitudinal sectional view thereof. The electromagnetic drive device MO comprises a magnet rotor 12 formed of a permanent magnet, a coil frame 13 for retaining the magnet rotor 12 to be rotatable, a coil 14 wound around the coil frame 13, and a yoke 15 fitted around the coil 14. The magnet rotor 12 rotates when a current is supplied to the surrounding coil 14.

The magnet rotor 12 comprises a permanent magnet 16, a rotational shaft 17, and a transmission member 18 (described later). The permanent magnet 16 with a cylindrical shape is formed of a magnetic material such as a plastic including a rare earth metal. The rotational shaft 17 is inserted into a center hole in the permanent magnet 16 and firmly fixed with an adhesive. The rotational shaft 17 is integrally provided with the transmission member 18 with a resin molding. The magnet 16 and the rotational shaft 17 may be integrally formed of a same material. In this embodiment, the rotational shaft 17 is inserted and firmly fixed to the through-hole at the center of the magnet 16. Alternatively, a magnet may be installed in a synthetic resin holder having a rotational shaft without providing a center hole in a magnet.

In this manner, the magnet rotor 12 having the rotational shaft 17 is rotatably disposed in the coil frame 13, and the coil 14 is wound around the coil frame 13. The coil frame 13 is formed of two coil frame halves 13a and 13b divided into two portions at the rotational shaft 17 of the rotor 12, so that the coil frame 13 retains the magnet rotor 12 with the tubular magnet 16.

As shown in FIG. 2, the coil frame 13 is usually formed in a hollow tube body, and includes a cavity 19 for accommodating the magnet rotor 12; bearings 20 and 21 for supporting the rotational shaft 17 of the rotor 12; an opening 22 for allowing the transmission member 18 to protrude outwardly; and a bobbin part 23 for winding the coil 14. The coil frame 13 is divided into the two coil frame halves 13a and 13b along an axial direction (refer to FIG. 2), and is formed of a synthetic resin. When the two coil frame halves 13a and 13b are joined, the magnet rotor 12 is accommodated in the coil frame 13, and both end portions of the rotational shaft are supported on the bearings 20 and 21 formed in the cavity 19. The opening 22 extending from connection surfaces 24a and 24b of the two coil frame halves 13a and 13b is formed at a peripheral side of the coil frame 13 for allowing the transmission member 18 of the rotor 12 to protrude outwardly.

The coil frame 13 has the hollow tube body having upper and lower end surfaces and divided in a longitudinal direction as shown in FIG. 2. Each of the coil frame halves 13a and 13b is integrally provided with the cavity 19 for accommodating the magnet rotor 12, the bobbin part 23 for winding the coil 14, one of the connection surfaces 24a and 24b, the opening 22 extending from the connection surfaces, and one of the bearing portions 20 and 21 for supporting the rotational shaft 17.

The connection surfaces 24a and 24b are provided with positioning pins 25 for engaging fitting holes 26 formed in the coil frame halves at suitable places (four pins in the embodiment). The coil frame 13 is also provided with protrusions 27 to be fixed to the base plate 1 of the light quantity adjustment device.

In the magnet rotor 12, the rotational shaft 17 is fixed to the center axis hole of the cylindrical permanent magnet 16 with the adhesive, and the arm-like (bar-like) transmission member 18 is integrated with the rotational shaft 17 to protrude outside of the magnet 16 in a radial direction. The magnet 16 is formed of a magnetic material such as a rare earth synthetic resin as described above. The rotational shaft 17 is formed of a synthetic resin such as polycarbonate with a resin molding, and the transmission member 18 is integrated with the rotational shaft 17. The magnet 16 is polarized in two poles N and S, so that the two poles N and S are located in a direction approximately perpendicular to the transmission member 18. The transmission member 18 is arranged in a direction perpendicular to the direction of the N and S magnetic poles of the magnet 16, so that the transmission member 18 is arranged in a direction approximately perpendicular to the coil 14 winding in a direction same as that of the N and S magnetic poles.

That is, the coil 14 is wound in a direction approximately identical to the magnetic poles N and S of the magnet 16 to obtain high output. The transmission member 18 is arranged in a direction approximately perpendicular to the coil 14, so that the transmission member rotates left and right by a predetermined angle, for example, 30 degrees and 60 degrees in total. Such an arrangement is preferred. Accordingly, it is necessary to wind the coil 14 on the coil frame 13 over a range as wide as possible except a moving range of the transmission member 18 rotating left and right by a predetermined angle, thereby increasing an output torque or reducing an outer diameter of the coil frame. At this time, the transmission member 18 is arranged to rotate left and right by a predetermined angle with a direction approximately perpendicular to the coil 14 as a center point, thereby obtaining a large space (bobbin part 23) of the coil frame for winding the coil in a case that a rotational angle of the transmission member is constant.

With the configuration, when the coil frame 13 has a same diameter, it is possible to obtain a higher torque, and when the output torque is constant, the diameter of the coil frame 13 can be reduced.

Figure 4:
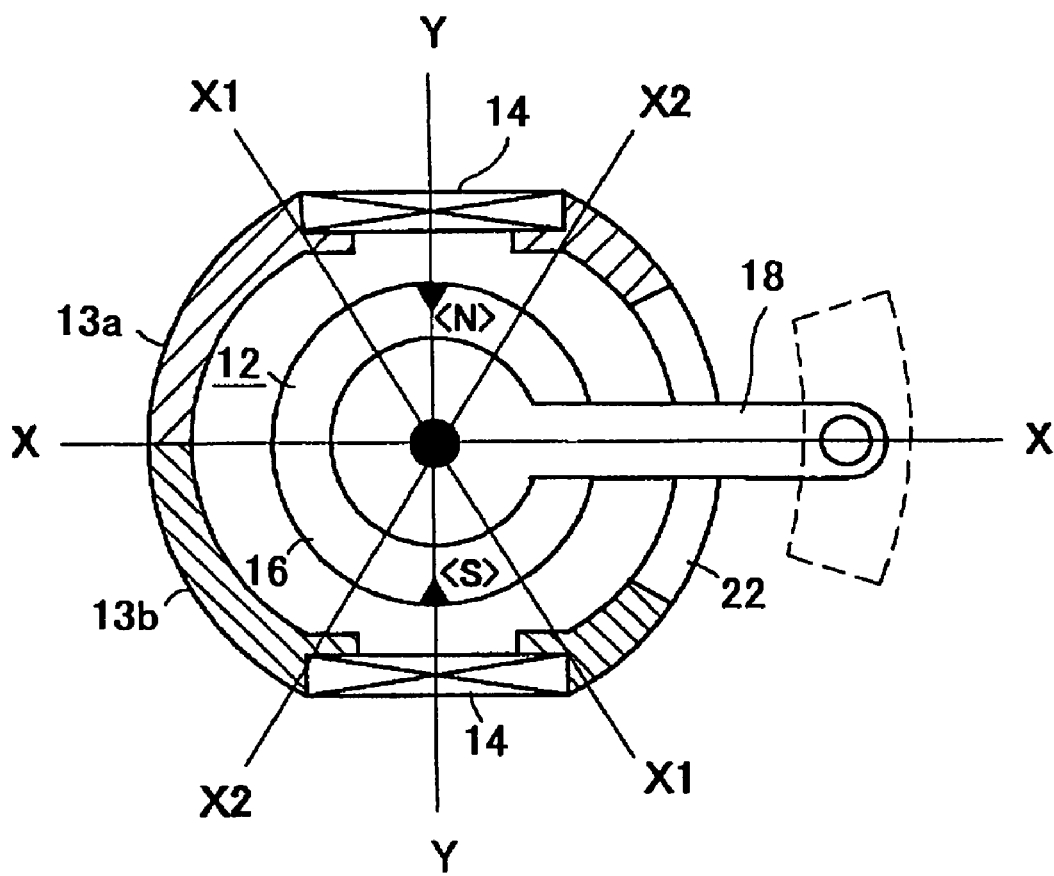
FIG. 4 is an explanatory view of an operational state of the electromagnetic drive device shown in FIG. 1.

As shown in FIG. 4, the N and S magnetic poles of the magnet 16 is aligned with a winding direction of the coil 14 on line Y—Y, and the transmission member 18 attached to the magnet is arranged to rotate with a center point on line X—X approximately perpendicular to the line Y—Y. The transmission member 18 rotates to both sides by a predetermined angle with the X—X line as the center point (intermediate position) of the rotation.

Incidentally, the bobbin part 23 is formed in a concave groove at an outer periphery of the coil frame 13 as a winding margin of the coil 14. The bearing portions 20 and 21 are formed in the coil frame 13 as notches formed in the coil frame halves 13a and 13b for inserting the rotational shaft 17 of the magnet rotor 12. One of the coil frame halves is provided with an arc-like notch 20a for fitting the rotational shaft 17, and the other of the coil frame halves is provided with a U-shaped notch 20b (refer to FIG. 5), so that one end of the rotational shaft 17 is supported when the notches are joined. Incidentally, although not shown in the drawing, the rotational shaft 17 has the other end same as the one end.

The rotational shaft 17 is supported on the arc-like notch joined to the U-shaped notch. If the both notch are formed in a circular shape, the rotational shaft 17 does not rotate smoothly when a positional misalignment of the two coil frame halves 13a and 13b occurs, or a dimension error in manufacturing and a so-called bite phenomenon occur. In the embodiment, the rotational shaft 17 fits in the arc-like notch part 20a formed in the one of the two coil frame halves 13a and 13b, and the U-shaped notch part 20b formed in the other pushes the shaft 17 with a plane, thereby preventing the bite phenomenon.

Accordingly, in the embodiment, the coil frame has the divided coil frame halves, and the coil frame halves have the connection surfaces at the upper and lower ends thereof along a direction intersecting a winding direction of the coil.

Figure 5:
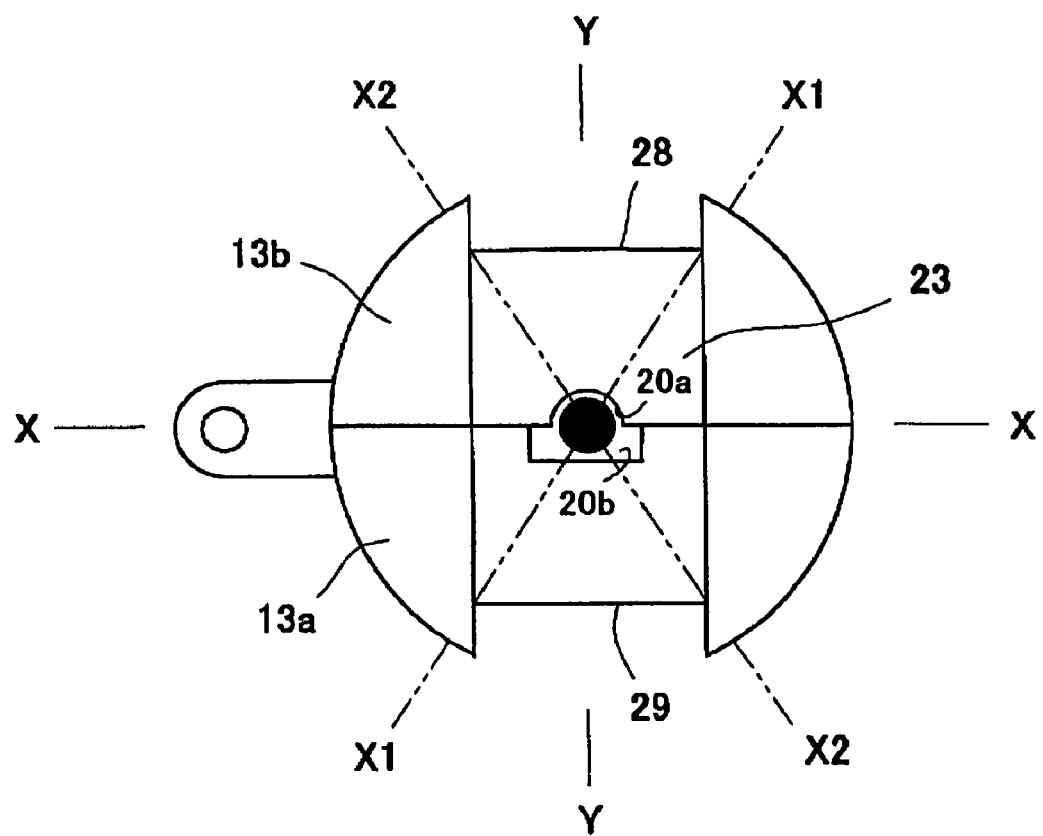
FIG. 5 is an end view of a coil frame of the electromagnetic drive device shown in FIG. 1.

As a result, a linear groove is generated between the connection surfaces 24a and 24b at the upper and lower ends of the two coil frame halves 13a and 13b formed in the cylindrical tube body, and the coil 14 is wound in a direction intersecting the linear groove. As shown in FIG. 5, the two coil frame halves 13a and 13b are joined long X—X line, and the bobbin part 23 is formed in a concave groove around the coil frame halves 13a and 13b, so that the coil is wound in a Y—Y direction. In this case, the X—X line formed by the connection surfaces 24a and 24b is aligned with a direction approximately perpendicular to the Y—Y line formed by the coil 14.

It is possible to arrange the X—X line formed by the connection surfaces 24a and 24b between X1—X1 line and X2—X2 line in FIG. 5 (positions deviating from ridgelines of the bobbin part), or arrange the X—X line at a position outside the range. When the connection surfaces are located between the X1—X1 and X2—X2 lines, the coil always crosses the linear groove formed by the connection surfaces in an intersecting direction, so that the coil wire does not enter the groove and is not damaged. Even when the connection surfaces are somewhat away from the range between the X1—X1 and X2—X2 lines, the groove formed by the connection surfaces is shallow, and the groove becomes deeper as the connection surfaces away from the range. That is, when the groove formed by the connection surfaces at ridges 28 and 29 of the coil frame is in an allowable range relative to a diameter of the coil wire, the connection surfaces may be located at a position outside the range.

Next, a positional relation between the connection surfaces 24a and 24b of the two coil frame halves 13a and 13b and the transmission member 18 will be explained. It is necessary to provide the opening 22 in the peripheral surfaces of the coil frame halves 13a and 13b for allowing a rotation of the transmission member 18. It is also necessary to form the opening 22 to extend from the connection surfaces located at the peripheral surfaces of the coil frame halves 13a and 13b, so that the magnet 16 integrated with the transmission member 18 is accommodated in the coil frame.

As shown in FIG. 2, the coil frame halves 13a and 13b are divided in the longitudinal direction, and the opening 22 is a notch formed in the peripheral surfaces of the two coil frame halves 13a and 13b and extending from each of the two coil frame halves 13a and 13b. With this configuration, when the two coil frame halves 13a and 13b are joined, the magnet rotor 12 is installed and the transmission member 18 protrudes outwardly.

As described above, the magnet rotor 12 is installed in the coil frame halves 13a and 13b, and the coil frame halves 13a and 13b are joined. Then, the coil 14 is wound around the outer periphery of the coil frame 13 in the direction intersecting the connection surfaces 24a and 24b at the upper and lower ends of the coil frame halves 13a and 13b. Lastly, the yoke 15 is attached to the outer peripheries of the coil frame halves 13a and 13b, thereby obtaining the electromagnetic drive device MO. The coil frame halves 13a and 13b are formed of a polycarbonate-base resin with a resin molding, and the magnet rotor 12 is formed of a rare earth resin with sintering. An outer diameter of the coil frame 13 is 5 mm, and a copper wire with a diameter of 0.004 mm is wound 200 times to form the coil. A width of the bobbin part of the coil frame is 3 mm.

Such a drive device MO is made small with a diameter of 5 mm, and the winding margin of the coil 14 is 3 mm. In this constitution, the coil winding margin (bobbin part) is a single piece, and the coil 14 is wound in the direction intersecting the connection surfaces 24a and 24b of the coil frame halves 13a and 13b, thereby reducing a size of the device. In the drive device MO, the coil frame halves 13a and 13b are provided with the protrusions 27 at four places, and the protrusion 27 is formed in a hook shape with a reverse L-shape section. The protrusion 27 is fitted in the protrusion 7 formed in the base plate 1 of the light quantity adjustment device SH, so that the drive device MO is attached to the base plate 1.

The light quantity adjustment device with this configuration is incorporated into, for example, a photographing lens of a camera, and the blades 3 and 4 are urged in closing directions (arrow directions in FIG. 1) by a spring (not shown). A current is supplied to the coil 14 from a power source upon a release operation of the camera. As a result, the coil 14 generates a magnetic field to rotate the magnet rotor 12 clockwise in FIG. 1, so that the blades 3 and 4 open the optical axis aperture 6. Accordingly, the exposure for photographing starts. When the camera receives a signal of an exposure completion, a reverse current is supplied to the coil 14 to rotate the magnet rotor 12 counterclockwise, and the blades 3 and 4 close the optical axis aperture 6. Accordingly, it is possible to adjust the light quantity in a shutter operation of various camera devices.

Figure 7:
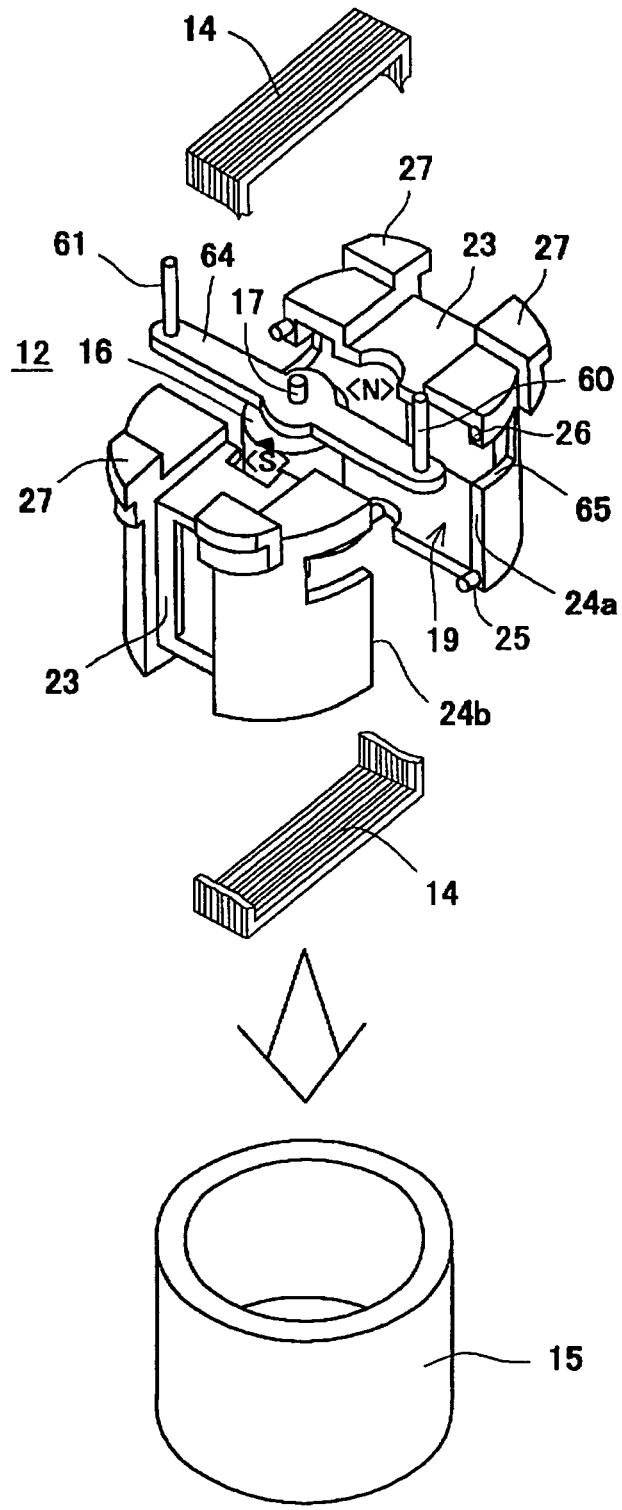
FIG. 7 is an exploded perspective view of the electromagnetic drive device shown in FIG. 6.
Figure 8:
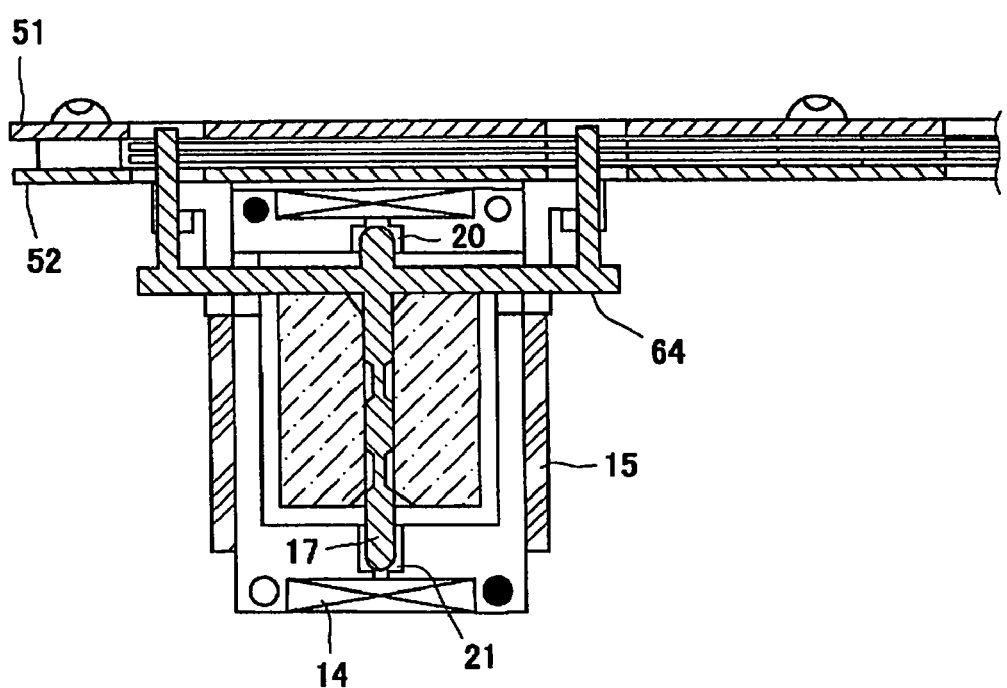
FIG. 8 is a longitudinal sectional view of a main part of the electromagnetic drive device shown in FIG. 6.

Next, a light quantity adjustment device will be explained with reference to an exploded perspective views of FIGS. 6 and 7 and a longitudinal sectional view of FIG. 8. The light quantity adjustment device is a stop device for adjusting a quantity of light passing through a photographing optical axis according to a photographing condition.

Figure 6:
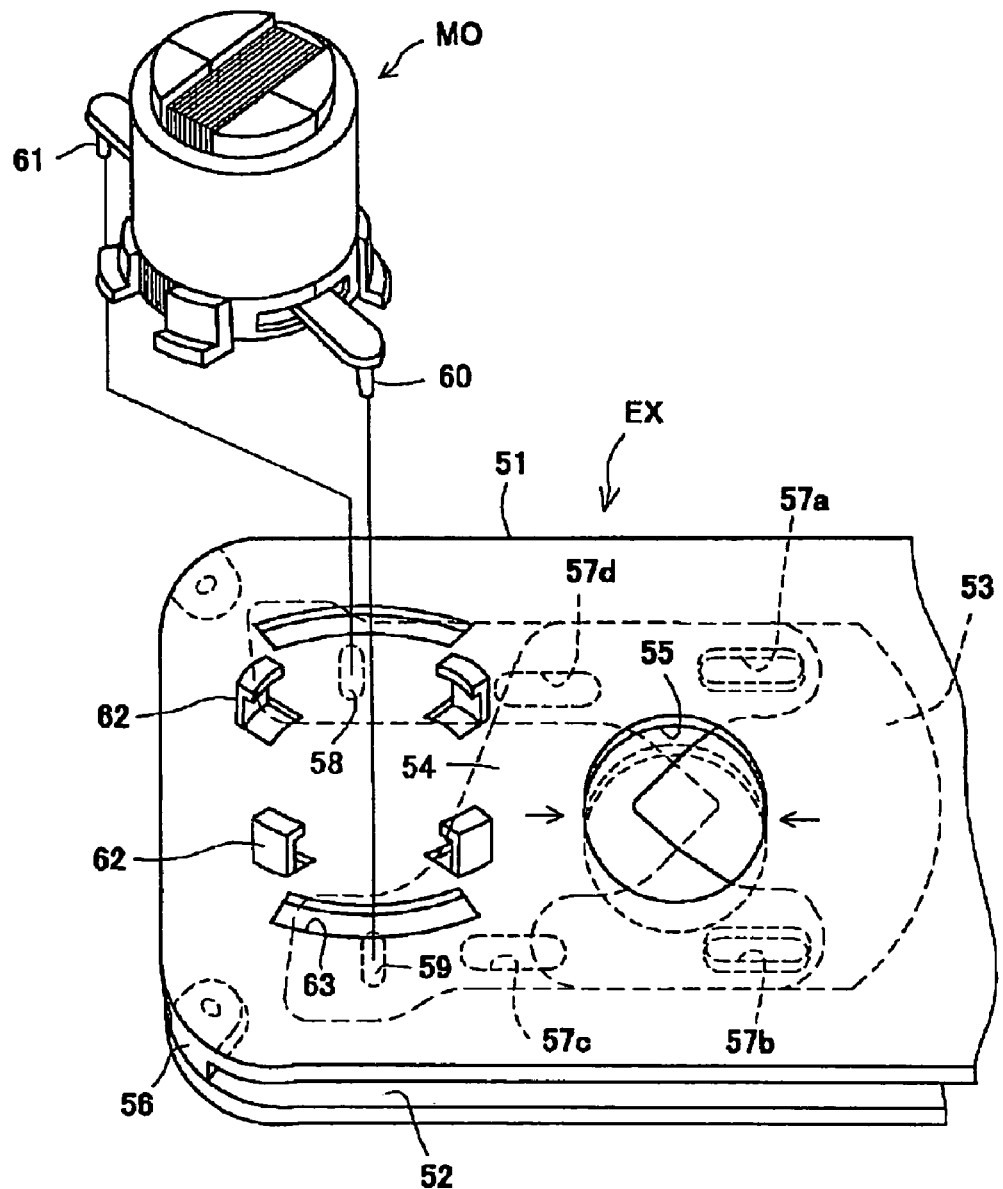
FIG. 6 is a perspective view showing a light quantity adjustment device (stop device) in a partially exploded state according to the invention.

As shown in FIG. 6, EX denotes the light quantity adjustment device as the stop device, and MO denotes the electromagnetic drive device. The light quantity adjustment device EX is arranged such that stop blades 53 and 54 are slidably incorporated between a pair of flat base plates 51 and 52, and a diameter of an optical axis aperture 55 provided in the base plates 51 and 52 is adjusted by the blades 53 and 54. The base plate 51 is formed of a synthetic resin such as polycarbonate with a resin molding, and an optical axis aperture 55 is formed at a center of the base plate 51. A rib (not shown) is formed around the optical axis aperture 55 for guiding the blades 53 and 54.

The base plate 52 is formed of a thin metal plate and the like, and is attached to protrusions 56 provided on the base plate 51 to form a gap between the base plate 51 for allowing the blades to slide. The stop blades 53 and 54 are provided with slits 57a to 57d at four places for inserting pins (not shown) formed in the base plate 51, so that the stop blades 53 and 54 are supported and move left and right in FIG. 6.

The blade 53 is provided with a slit 58 at a base end thereof, and the blade 54 is provided with a slit 59 at a base end thereof. Transmission pins 60 and 61 of the electromagnetic drive device (described later) engage the slits 58 and 59, so that the blades 53 and 54 move mutually in different directions by the transmission pins to change a diameter of the optical axis aperture 55.

A hook protrusion 62 with a reverse L-shape section is integrated with the base plate 51 for fixing the electromagnetic drive device MO. A slit 63 is formed in the base plate 51 as an escape groove for not hindering motions of the transmission pins 60 and 61. Incidentally, in the embodiment, the blade member is formed of the two blades, and may be formed of one piece or three or more pieces. In a case of one piece, the blade has an aperture with a diameter smaller than the optical axis aperture, and moves between a position facing the optical axis aperture of the base plate and a position away from the optical axis aperture to adjust the light quantity. In a case of three or more pieces, the blades are disposed around the optical axis aperture with a predetermined gap, and pins are provided in a ring-like operation member arranged at an outer periphery of the optical axis aperture for inserting into slits formed in the blades. The ring-like operation member rotates by a predetermined angle through transmission pins of the drive device (described later) to adjust a diameter of the optical axis aperture.

Next, the electromagnetic drive device MO will be explained with reference to an exploded perspective view of FIG. 7 and a longitudinal sectional view of FIG. 8. The same reference numerals denote components same as those in FIG. 2. The electromagnetic drive device MO comprises the magnet rotor 12 formed of a permanent magnet, the coil frame 13 for retaining the magnet rotor 12 to be rotatable, the coil 14 wound around the coil frame 13, and the yoke 15 fitted around the coil 14, so that the magnet rotor 12 rotates when a current is supplied to the surrounding coil 14.

The magnet rotor 12 comprises the magnet 16, the rotational shaft 17, and a transmission member 64 (described later). The magnet 16 has a cylindrical shape and is formed of a magnetic material such as a rare earth plastic. The rotational shaft 17 is inserted into a center hole of the cylindrical magnet 16 and firmly fixed with an adhesive. The rotational shaft 17 is integrally provided with the transmission member 64 with a resin molding of a synthetic resin.

The transmission member 64 is an arm member extending left and right with the rotational shaft 17 at a center, and is integrally provided with transmission pins 60 and 61 at tips thereof for engaging slits 58 and 59 formed in the stop blades 53 and 54. Accordingly, when the rotor 12 rotates, the transmission pins 60 and 61 swing in opposite directions, respectively.

The coil frame 13 is formed of the coil frame halves 13a and 13b divided into two portions at the rotational shaft 17 of the rotor 12, so that the coil frame 13 retains the magnet rotor 12 with the tubular magnet 16. Similar to the structure shown in FIG. 2, the coil frame 13 is formed in a hollow tube body, and includes the cavity 19 for accommodating the magnet rotor 12; the bearings 20 and 21 for supporting the rotational shaft 17 of the rotor 12; openings 65 for allowing the transmission member 64 to protrude outwardly; and the bobbin part 23 with the coil 14 wound thereon.

The coil frame 13 is divided into the coil frame halves 13a and 13b along the axial direction, and is formed of a synthetic resin. When the coil frame halves 13a and 13b are joined, the magnet rotor 12 is accommodated in the coil frame 13, and both end portions of the rotational shaft are supported on the bearings 20 and 21 formed in the cavity 19. A pair of the openings 65 extending from the connection surfaces 24a and 24b of the two coil frame halves 13a and 13b is formed at left and right peripheral sides of the coil frame 13 for allowing the transmission member 64 of the rotor 12 to protrude outwardly.

The positioning pins 25 are formed in the connection surfaces 24a and 24b for engaging the fitting holes 26 formed in the coil frame halves at suitable places (four places in this embodiment). The hook-shaped protrusions 27 with a reverse L-shape section are fixed to the base plate 51 of the light quantity adjustment device, so that the drive device MO is fixed to the base plate 51 through the engagement between the hook-shaped protrusions 62 and the base plate 51.

The magnet 16 is polarized in the two poles N and S, so that the two poles N and S are located in a direction approximately perpendicular to the transmission member 64 for the reason explained previously.

Accordingly, the connection surfaces are generated at the upper and lower ends of the divided coil frame halves in the direction intersecting the direction that the coil is wound. Such a stop device is incorporated into, for example, a photographing lens of a camera, and the blades 53 and 54 are urged in closing directions (arrow directions in FIG. 6) by the spring (not shown).

When an exposure start signal is transmitted to a stop control part upon a tuning-on operation of the camera, a photoelectric conversion element in the camera measures the light quantity passing through the optical axis aperture 55. When the light quantity is insufficient, a signal is sent to the stop control part and the current is supplied to the coil of the electromagnetic drive device from the power source. The magnetic field is generated in the coil 14 to rotate the magnet rotor 12 counterclockwise in FIG. 6, and the blades 53 and 54 move to open the optical axis aperture 55 of the base plate 51.

When the photoelectric conversion element detects an appropriate light quantity, a predetermined current is supplied to the coil 14 to hold the blades. Conversely, when the photoelectric element detects an excessive light quantity, a reverse direction current is supplied to the coil 14 to thereby rotate the magnet rotor 18 clockwise, so that the blades 53 and 54 move to reduce a diameter of the optical axis aperture 55. When the photoelectric conversion element detects the appropriate light quantity, the predetermined current is supplied to the coil 14, thereby holding the blades. In this manner, it is possible to provide the light quantity adjustment device for performing the stop operation of various camera devices.

Figure 9:
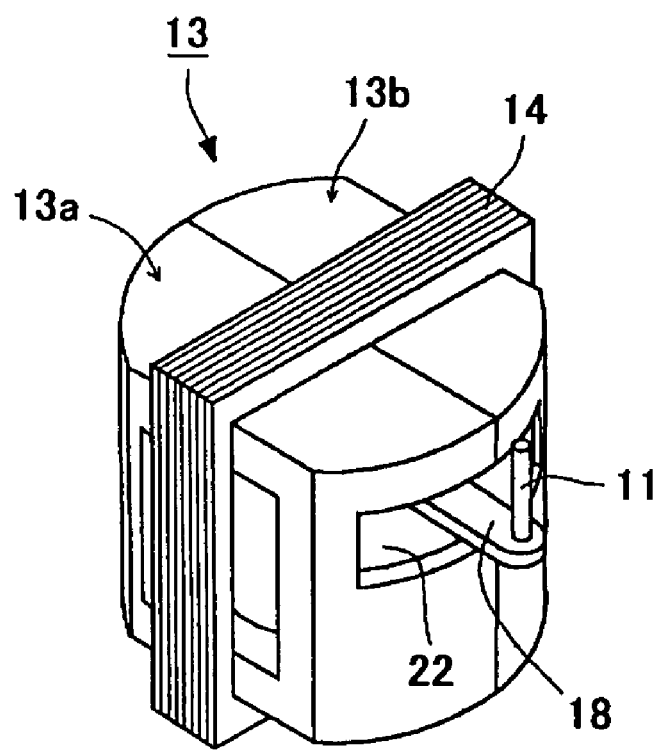
FIG. 9 is a perspective view showing an electromagnetic drive device according to another embodiment of the invention.
Figure 10:
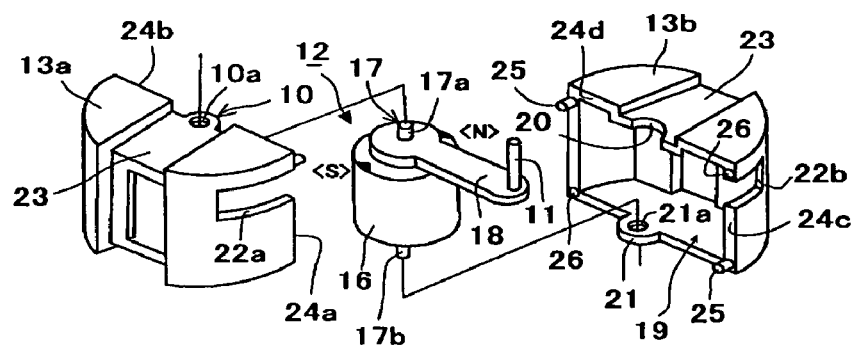
FIG. 10 is an exploded perspective view of the electromagnetic drive device shown in FIG. 9.
Figure 11:
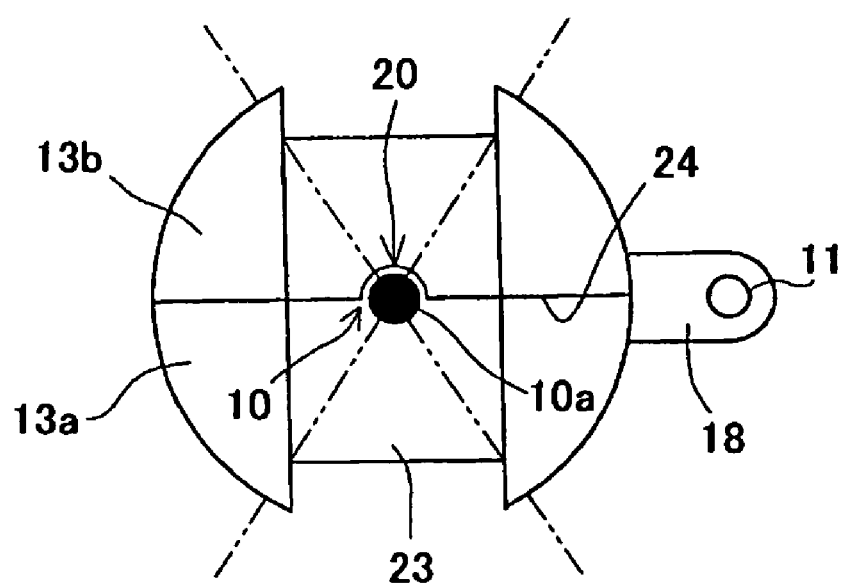
FIG. 11 is an end view of a coil frame of the electromagnetic drive device shown in FIG. 9.
Figure 12:
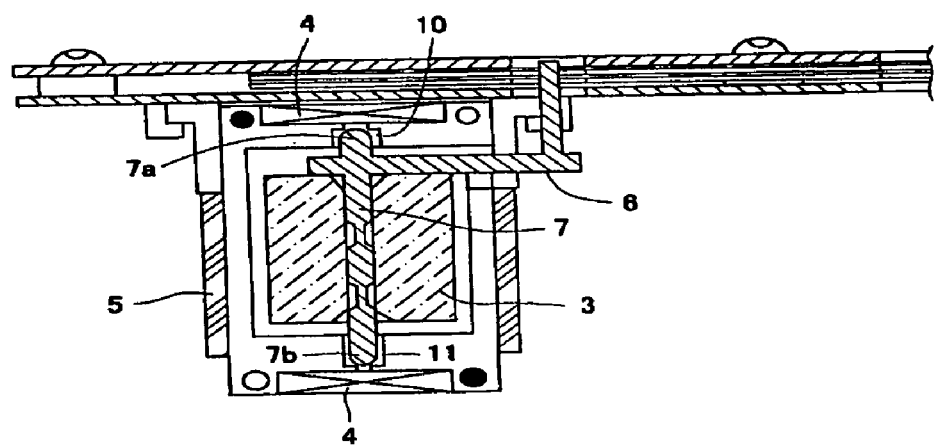
FIG. 12 is a longitudinal sectional view of the electromagnetic drive device shown in FIG. 9.

FIG. 9 is a perspective view of an electromagnetic drive device according to another embodiment of the invention. FIG. 10 is an exploded perspective view thereof. FIG. 11 is an end view of a coil frame, and FIG. 12 a longitudinal sectional view of a device shown in FIG. 9.

The electromagnetic drive device comprises the coil frame 13 formed in a hollow shape, the magnet rotor 12 rotatably supported in the inside cavity 19 of the coil frame 13, the coil 14 wound around the outer periphery of the coil frame 13, the transmission member 18 attached to the magnet rotor 12 for transmitting the rotation of the magnet rotor 12 to an outside, and the yoke 15 covering an outer periphery of the coil frame 13.

The coil frame 13 is formed of a synthetic resin with a resin molding, and is provided with the cavity 19 for retaining the magnet rotor 12 and the winging margin for winding the coil 14. The coil frame 13 has a hollow circular cylinder shape, and is formed of the two coil frame halves 13a and 13b divided left and right in an axial direction. The coil frame is constituted in this manner in order to facilitate a work of forming the cavity 19 and an operation of incorporating the magnet rotor 12 into the cavity 19.

Further, the coil frame 13 is divided left and right in the axial direction in order to reduce the positional misalignment of the coil frame halves 13a and 13b in the axial direction, when a size of the coil frame 13 is reduced in a radial direction to make the device small.

That is, in order to reduce a diameter of a lens-barrel part of a camera device, it is necessary to reduce a diameter of the light quantity adjustment device such as shutter blades and stop blades located on the photographing optical axis, and it is necessary to reduce a size of the drive device of the light quantity adjustment device not to protrude in an outer diameter direction from the photographing optical axis.

The coil frame 13 has a compact outer shape with a diameter of 4 mm and an axial length of 8 mm. The coil frame 13 is divided in the axial direction, so that the coil frame halves 13a and 13b are joined at the large connection surfaces, thereby reducing the positional misalignment therebetween.

The coil frame half 13a has the connection surface 24a at the peripheral sidewall end thereof, and the connection surfaces 24b at the upper and lower ends. Similarly, the coil frame half 13b has the connection surfaces 24c and 24d, so that the connection surface 24a contacts the connection surface 24c, and the connection surfaces 24b contact the connection surfaces 24d.

Incidentally, the positioning bosses 25 (protrusion) are provided in the connection surface 24c, and the corresponding holes are provided in the connection surface 24a. Also, the positioning holes 26 are provided in the connection surface 24c, and the corresponding protrusions are provided in the connection surface 24a.

The magnet rotor 12 has the permanent magnet 16 and the rotational shaft 17 provided at the center of the permanent magnet 16. The permanent magnet 16 is formed in a circular cylinder shape by sintering a magnetic material, and is polarized in the two poles N and S. As shown in FIG. 10, the permanent magnet 16 is magnetized such that the N pole and S pole face the cylindrical peripheral surfaces and are spaced by 180 degrees, and the rotational shaft 17 is inserted into the through-hole at the center of the magnet and bonded with the adhesive.

The rotational shaft 17 is a bar member formed of a synthetic resin, and the tip parts 17a and 17b are supported on bearing concave portions (described later) formed in the cavity 19 of the coil frame 13. In the rotational shaft 17, the transmission member 18 is integrally formed in the direction perpendicular to the axial direction, so that the rotation of the magnet rotor 12 is transmitted to the outside through the transmission member 18.

Incidentally, the transmission member 18 may be integrated with the rotational shaft 17 with the resin molding and the like, or may be individually formed and joined with the adhesive or a method such as press fitting. The transmission member 18 is provided with the transmission pin 11, and the transmission pin 11 engages the light quantity adjustment blades (shutter blades or stop blades).

The coil frame halves 13a and 13b are provided with the cavity 19 for accommodating the magnet rotor 12, and bearing concave portions 10a and 21a for supporting the rotational shaft 17 of the magnet rotor 12.

Conventionally, when the coil frame with a cylindrical shape is divided left and right in an axial direction through a center axis, coil frame halves are respectively provided with U-shaped notch grooves at end surfaces thereof, and the coil frame halves are joined to support a rotational shaft. However, when the device is made small, the coil frame has a diameter of 5 mm or less and the rotational shaft has a diameter of about 1 mm. In this case, it is difficult to form the coil frame halves 13a and 13b so that the rotational shaft 17 is supported on the left and right U-shape grooves. In addition to such a problem, in a case where a pivot bearing structure is designed to reduce a mechanical loss at the bearing portion, it is difficult to construct the conventional structure.

That is, in a case where a tip of the rotational shaft is sharpened to 60 degrees, the bearing concave portion must be formed in a triangular pyramid shape to support the tip of the rotational shaft. It is difficult to form the triangular pyramid shape by joining two concave grooves formed individually. Accordingly, in the embodiment, the bearing concave portion 10a is formed in the coil frame half 13a for supporting one end 17a of the rotational shaft 17, and the bearing concave portion 21a is formed in the coil frame half 13b for supporting the other end 17b of the rotational shaft 17.

A bulge part 10 is formed at an upper end of the coil frame half 13a, and the bearing concave portion 10a consisting of a through-hole is formed in the bulge part 10. A concave part 20 corresponding to the bulge part 10 is formed at an upper end of the coil frame half 13b. The one end 17a of the rotational shaft 17 of the magnet rotor 12 is supported on the bearing concave portion 10a of the coil frame half 13a.

Similarly, a bulge part 21 and the bearing concave portion 21a are formed at a lower end of the coil frame half 13b, and a concave part (not shown) corresponding to the bulge part 21 is formed at a lower end of the coil frame half 13a.

In this manner, the bearing concave portion 10a is formed in the coil frame half 13a for supporting the one end 17a of the rotational shaft 17, and the bearing concave portion 21a is formed in the coil frame half 13b for supporting the other end 17b of the rotational shaft 17, so that the two coil frame halves 13a and 13b are easily joined and the magnet rotor 12 is easily installed.

The coil 14 is wound around the coil frame 13 in the direction perpendicular (intersecting) to a polarization direction (peripheral direction) of the permanent magnet 16 of the magnet rotor 12. The concave groove 23 is formed at the outer periphery of the coil frame 13 as the winding margin of the coil. Further, the opening 22 is provided in the peripheral side surface of the coil frame 13, so that the transmission member 18 protrudes outwardly. The opening 22 is formed of a slit-like opening 22a notched in the connection surface 24a of the coil frame half 13a and a slit-like opening 22b notched in the connection surface 24c of the coil frame half 13b.

As shown in FIG. 11, the groove 24 is formed between the connection surfaces of the two coil frame halves 13a and 13b around the whole outer periphery of the coil frame 13, and the coil 14 is wound around the outer periphery of the coil frame 13.

Conventionally, the coil is wound while avoiding the groove generated by the connection surfaces, so that a coil wire is not broken by the groove. Accordingly, the coil is individually wound around each of the coil frame halves 13a and 13b, and wire ends of the two coils are connected to form a single coil. As a result, a band connection part is formed at a center of the coil frame 13 where the coil is not wound. Due to the band connection part, it is necessary to increase the coil frame diameter for providing a large margin of winding the coil to obtain a predetermined output, thereby making it difficult to reduce a size of the device.

In the embodiment, the coil is wound in the direction intersecting the linear groove generated by the connection surfaces, so that the coil can be wound over the whole area of the coil frame without breaking the wire. Accordingly, it is possible to obtain a high output with the coil frame having a same diameter, or it is possible to reduce a diameter of the coil frame with the same output, thereby reducing a size of the device.

In this manner, the concave groove 23 is provided on the outer periphery of the coil frame 13 in the direction intersecting (or perpendicularly) the connection surfaces of the coil frame halves 13a and 13b, and the coil 14 is wound around the concave groove 23. The yoke 15 with a ring shape is formed of a soft magnetic material, and is fitted to the coil frame 13 for covering the outer periphery of the coil frame 13 and shielding a leakage magnetic flux.

As described above, according to the embodiments of the invention, the coil frame is formed of the two coil frame halves divided left and right in the axial direction along the rotational shaft of the magnet rotor. The magnet rotor is installed in the coil frame, and the coil is wound around the outer periphery of the coil frame. The coil is wound in the direction intersecting the connection surfaces of the two coil frame halves, i.e. the coil wire is wound while intersecting the groove generated between the connection surfaces of the coil frame halves, so that it is possible to wind the coil wire over the whole area of the coil frame without breaking. Accordingly, it is possible to reduce a size of the device and increase the output of the device.

Further, according to the embodiments of the invention, the coil frame is formed of the two coil frame halves divided left and right through the rotational shaft of the magnet rotor, so that the magnet rotor is installed therein and the coil is wound around the outer periphery thereof. The bearing concave portion is provided in one of the coil frame halves for supporting one end of the rotational shaft of the magnet rotor, and the bearing concave portion is provided in the other of the coil frame halves for supporting the other end of the rotational shaft. Accordingly, as compared with the conventional structure where the shaft is supported on the notch formed in each of the coil frame halves, it is not necessary to accurately form the bearing portion, so that the molding of the coil frame is easy.

Further, it is possible to reduce a frictional load on the rotational shaft of the magnet rotor at the bearing portion due to the positional misalignment of the two coil frame halves.

While the invention has been explained with reference to the specific embodiments of the invention, the explanation is illustrative and the invention is limited only by the appended claims.

What is claimed is:

1. An electromagnetic drive device comprising:
a coil frame having a hollow tubular shape and formed of two coil frame halves divided along a longitudinal direction thereof,
a magnet rotor rotatably disposed in the coil frame and having a rotational shaft extending along the longitudinal direction,
a transmission member attached to the magnet rotor for transmitting a rotation of the magnet rotor, and
a coil wound around an outer periphery of the coil frame in a direction intersecting joint faces at longitudinal ends of the two coil frame halves.

2. An electromagnetic drive device according to claim 1, wherein said transmission member extends in a direction substantially perpendicular to a direction that the coil is wound, said coil frame having an opening for allowing the transmission member to rotate for a predetermined angle.

3. An electromagnetic drive device according to claim 1, wherein said coil is wound in a direction substantially perpendicular to the joint faces, and said transmission member extends in a direction substantially perpendicular to a direction that the coil is wound.

4. An electromagnetic drive device according to claim 1, wherein one of said coil frame halves includes a pair of bearings for supporting the rotational shaft of the magnet rotor.

5. An electromagnetic drive device according to claim 1, wherein one of said two coil frame halves includes one of a pair of bearings for supporting the rotational shaft, and the other of said two coil frame halves includes the other of the pair of the bearings for supporting the rotational shaft.

6. An electromagnetic drive device according to claim 1, wherein one of said coil frame halves includes a first bearing concave portion for supporting one end of the rotational shaft, and the other of said coil frame halves includes a second bearing concave portion for supporting the other end of the rotational shaft.

7. An electromagnetic drive device according to claim 6, wherein each of said first and second bearing concave portions is formed in a projection extending from one of the coil frame halves toward the other of the coil frame halves.

8. An electromagnetic drive device according to claim 6, wherein said rotational shaft has ends formed in a pointed shape, said bearing concave portions being formed of pivot bearings.

9. An electromagnetic drive device according to claim 6, wherein said coil is wound in a direction intersecting the joint faces at two end surfaces of the coil frame halves in the longitudinal direction.

10. An electromagnetic drive device comprising:
a cylindrical magnet rotor having a rotational shaft and a pair of magnetic poles at two sides thereof in a direction perpendicular to the rotational shaft,
a transmission member attached to the magnet rotor and extending in a direction substantially perpendicular to the magnetic poles and in a radial direction of the magnet rotor,
a coil frame with a hollow tubular shape for retaining the transmission member and the magnet rotor therein to be rotatable through the rotational shaft, said coil frame having two coil frame halves divided in a direction intersecting the magnetic poles,
a coil wound around an outer periphery of the coil frame in a direction substantially along the magnetic poles, and an opening formed at joint faces of the coil frame for allowing the transmission member to rotate for a predetermined angle.

11. An electromagnetic drive device according to claim 10, wherein said two coil frame halves are connected to form the coil frame; said transmission member projects outwardly through the opening, and; one of said coil frame halves includes a first pivot bearing portion for supporting one end of the rotational shaft, and the other of said coil frame halves includes a second pivot bearing portion for supporting the other end of the rotational shaft.

12. A light quantity adjustment device comprising the electromagnetic drive device according to claim 1, a base plate attached to the electromagnetic drive device and having an optical axis aperture, and a blade member attached to the transmission member for adjusting a quantity of light passing through the optical axis aperture so that when the magnet rotor is rotated, the blade member moves relative to the optical axis aperture.

13. A light quantity adjustment device comprising the electromagnetic drive device according to claim 10, a base plate attached to the electromagnetic drive device and having an optical axis aperture, and a blade member attached to the transmission member for adjusting a quantity of light passing through the optical axis aperture so that when the magnet rotor is rotated, the blade member moves relative to the optical axis aperture.

* * * * *